(12) United States Patent
Burdin (10) Patent No.: US 11,590,374 B2
(45) Date of Patent: Feb. 28, 2023

(54) MOBILE COMPRESSED FOAM FIREFIGHTING SYSTEM

(71) Applicants: JOINT STOCK COMPANY "ROSENERGOATOM", Moscow (RU); LIMITED, LIABILITY COMPANY "THE URAL-SIBERIAN FIRE-FIGHTING AND TECHNOLOGICAL COMPANY", g. Chelyabinsk (RU); JOINT, STOCK COMPANY "SCIENCE AND INNOVATIONS", Moscow (RU)

(72) Inventor: Aleksandr Mikhailovich Burdin, g. Chelyabinsk (RU)

(73) Assignees: JOINT STOCK COMPANY "ROSENERGOATOM", Moscow (RU); JOINT STOCK COMPANY "SCIENCE AND INNOVATIONS", Moscow (RU); LIMITED LIABILITY COMPANY "THE URAL-SIBERIAN FIRE-FIGHTING AND TECHNOLOGICAL COMPANY", G. Chelyabinsk (RU)

(*) Notice: Subject to any disclaimer, the term of this patent is extended or adjusted under 35 U.S.C. 154(b) by 279 days.

(21) Appl. No.: 16/627,509

(22) PCT Filed: Dec. 29, 2017

(86) PCT No.: PCT/RU2017/001013
§ 371 (c)(1),
(2) Date: Dec. 30, 2019

(87) PCT Pub. No.: WO2018/231096
PCT Pub. Date: Dec. 20, 2018

(65) Prior Publication Data
US 2020/0147428 A1 May 14, 2020

(30) Foreign Application Priority Data

Jun. 14, 2017 (RU) .......................... RU2017120827
Jun. 14, 2017 (RU) .......................... RU2017120828

(51) Int. Cl.
*A62C 5/02* (2006.01)
*A62C 27/00* (2006.01)
(Continued)

(52) U.S. Cl.
CPC .............. *A62C 5/024* (2013.01); *A62C 27/00* (2013.01); *A62C 37/04* (2013.01); *A62C 37/36* (2013.01); *B60L 1/003* (2013.01); *B60L 2200/26* (2013.01)

(58) Field of Classification Search
CPC ......... A62C 5/024; A62C 27/00; A62C 37/04; A62C 37/36; A62C 5/022; A62C 5/02;
(Continued)

(56) References Cited

U.S. PATENT DOCUMENTS

2009/0288845 A1* 11/2009 Belford .................... A62C 5/02
169/15
2013/0048318 A1* 2/2013 Ewers ................... A62C 31/12
169/46

* cited by examiner

*Primary Examiner* — Qingzhang Zhou
(74) *Attorney, Agent, or Firm* — J. Miguel Hernandez; James R. Gourley; Carstens, Allen & Gourley, LLP (57) ABSTRACT

A mobile compressed foam firefighting unit comprising a mixing chamber connected at the outlet to the foam feeder, and the following systems connected to the mixing chamber inlet: a water supply system comprising a water pump and a water pump drive, a foam concentrate supply system comprising a foam pump and a foam pump drive, and an air supply system comprising an air compressor and an air pump drive. The system includes a drive motor, and drives of the air compressor and the foam pump comprise variable hydraulic transmissions kinetically connected to the drive (Continued)

motor, and the system is equipped with a water flow meter, a throttle valve with an electric drive and a check valve, and an electronic control unit of the throttle valve installed in the water supply pipe between the water pump and the mixing chamber.

7 Claims, 1 Drawing Sheet

(51) Int. Cl.
*A62C 37/36* (2006.01)
*B60L 1/00* (2006.01)

(58) Field of Classification Search
CPC .. B60L 1/003; B60L 2200/26; B01F 23/2323; B01F 23/235; B01F 23/291
See application file for complete search history.

MOBILE COMPRESSED FOAM FIREFIGHTING SYSTEM

CROSS-REFERENCE TO RELATED APPLICATIONS

This application is a US 371 application from PCT/RU2017/001013 filed Dec. 29, 2017, which claims priority to (1) Russian Application No. 2017120828 filed Jun. 14, 2017, and (2) Russian Application No. 2017120827 filed Jun. 14, 2017, the technical disclosures of which are hereby incorporated herein by reference.

A group of inventions pertains to firefighting equipment, namely to ground fire fighting vehicles with foam generation by compression.

A unit for creating compressed (gas-filled) foam, which cools the burning zone and at the same time isolates it from air oxygen is known from article Portable Unit For Creating Compressed (Gas-Filled) Foam (by M. R. Shavaleev, A. V. Koksharov) (M. R. Shavaleev, A. V. Koksharov Portable Unit For Creating Compressed (Gas-Filled) Foam//Modern Civil Defense and Emergency Response Technologies journal, published by Federal State-Funded Educational Institution Voronezh Institute of State Fife Fighting Service of EMERCOM of Russia. 2015, Publication 1 (6)/Vol. 1. pp. 216-220). The use of compressed foam versus water has a number of advantages: low blow-back and ease of holding a fire hose nozzle when supplying extinguishing agent; low hose weight, which gives more mobility to a nozzle operator; the ability to supply foam through a standpipe to a height of 250 meters at a pressure in the system not exceeding 10 atm; low steam generation, which leads to improved visibility when extinguishing; increased accuracy of foam delivery and reduced risk of burn injuries to firefighters; low thermal foam conductivity, which facilitates operation under low temperatures. Also, the source discloses design of the portable unit, comprising a metal pipeline, whose ends contain heads for connection to hose lines, to a fire pump (water pump) on one side and to a device of foam delivery to the seat of fire (fire hose, hand-held nozzle, deluge gun) on the other side; a system of dosing and supplying foaming agent (foam concentrate) and a system of air supply from the cylinders of respiratory protective equipment through a reducer. The foaming agent dosing and supply system designed to supply and dose foaming agent into the unit from an external tank includes a submersible pump that takes the foaming agent from the external tank and transports it under pressure to a feeding device. The feeding device is a Pitot tube with its bent end turned in the direction of fluid flow. There is a valve for foaming agent dosing in front of the feeding device that controls saturation of the foaming agent solution by opening or closing. Foaming agent mixes with water under the action of folding turbulent mode. Compressed foam characteristics are controlled by the flow rate of foaming agent solution using a valve. The design of a portable compressed foam unit proposed in this article is mainly aimed at modernization of existing mobile fire-fighting units in order to expand their functionality while reducing the cost of such an expansion.

Drawbacks of the disclosed unit include:
the need to use compressed air cylinders;
the need for a prompt manual adjustment of firefighting system upgraded thereby, where manual adjustment shall be performed, including when changing the supply pressure of any foam component (water, foam-forming concentrate, compressed air), for example, when operating the system from a backwater source (fire hydrants, etc.);
no automatic adjustment of supply pressures of water, foam-forming concentrate and compressed air when changing the pressure at the unit outlet (back pressure), depending on the hydraulic resistance of pressure hoses, through which the finished foam is supplied, and on the geometric height of the foam rise along these hoses that requires manual change in the pressure of these components to overcome it, which is even more difficult in the absence of direct visibility of the jet from the working place of the unit operator;
no automation of compressed foam generation, since the systems of foaming agent dosing and supply and air supply from the cylinders of personal respiratory protective equipment has no controllers that control the operation of devices depending on the required and current characteristics of the finished foam, so the manual adjustment of foam components' supply is required;
the need for prompt manual adjustment of the upgraded fire-fighting unit, where a manual adjustment shall be carried out, including when changing the supply pressure of any foam component (water, foam-forming concentrate, compressed air), for example, when operating the unit from a backwater source (fire hydrants, etc.), and when changing the outlet pressure, depending on the hydraulic resistance of pressure hoses through which the ready foam is supplied, and on the geometric height of the foam rise through these hoses;
no maintenance elements of the proposed unit, including a drainage and flushing system.

Also, a mobile robotic firefighting complex comprising a compressed foam firefighting system consisting of a mixer, a centrifugal pump, solenoid valves, a pressure switch, an auxiliary high pressure pipeline, a fire monitor, and a pressure transducer (reducer) is known from RF utility U.S. Pat. No. 2,580,779 published on 10 Apr. 2016, IPC A62C 27/00. The mixer provides for connection of a fire hose from a tank truck or fire hydrant and a foam generator through inlet connection pipes with quick-release coupling heads. A hydraulically driven centrifugal pump provides a capacity of 31 l/sec. Moreover, a high-pressure line has a quick-release connection for connecting an additional fire hose to a hand-held hose (fire hose). Also, said fire firefighting system includes a foam generator, a water tank, a compressed air tank and a foaming agent tank. The main element of this unit is a foam generator, which forms low expansion air-mechanical foam from water and foaming agent using compressed air (compressed foam), and air is supplied to the system from a high-pressure cylinder through the reducer, which provides pressure reduction to the operating level. Foaming agent is stored in a special tank. The tank is under atmospheric pressure in the standby mode, and inflated with air when the unit is started. The mixture is used when extinguishing fires away from water bodies or when extinguishing fires that require sophisticated firefighting activities. The resulting compressed foam is delivered through a fire monitor to the seat of fire. Drawbacks of the known unit include:
the need to use cylinders with compressed air that supply not only compressed air, but also foaming agent, which, when compressed air in the cylinders runs out, makes it impossible to extinguish the fire with compressed foam;

no maintenance elements of the proposed unit, including the drainage and flushing system.

The closest equivalent of the proposed mobile compressed foam firefighting system is CAFSPro (fire extinguishing system CAFSPro) manufactured by HALE PRODUCTS, INC, disclosed in the user manual published on the Internet site:

https://lacountyfirefighters.org/items/QMAX_MUSCLE_PUMP_CAFS_Manual.pdf

The known engineering solution is a system comprising the following main elements: a centrifugal fire pump (fire pump or water pump), which provides water supply with the necessary gage pressure; a positive displacement pump, which provides supply and injection of foaming concentrate into the water flow to produce the initial foaming solution (foam pump); a dosing device, which provides automatic control of the foaming concentrate amount (hereinafter, FA) to be injected into the water flow (FA dispenser); an air compressor that supplies compressed air to the original foaming solution, after mixing with the solution, the unit generates the finished foam (compressor); a mechanical transmission, which drives the air compressor from the fire pump shaft through a belt transmission (belt drive); a mixing chamber, which generates foam by mixing the original foam solution and compressed air (mixing chamber); measuring devices, electronic control units, shut-off and control valves and other switching components.

The operating principle of the known engineering solution involves foam generation from three initial components: water, foaming concentrate and compressed air, which are fed in a certain dosage into the mixing chamber, where, subjected to intensive bubbling, are transformed into the finished foam due to surface active properties of the initial liquid.

Depending on the type of foam concentrate used and on the density of foam desired at the unit output every time it is used (which is determined by firefighting tactics), the ratio of these foam components (water, foaming agent and compressed air) can be varied by the operator through the appropriate presets. In particular, in some cases either lighter foam—with a higher relative air content, commonly referred to as "dry" foam, or heavier foam—with lower relative air content, commonly referred to as "wet" foam can be used for firefighting.

Required proportions of the foam components, entered by an operator as presets are provided by special automatic regulators, which, depending on the current water consumption, inject the required amount of foaming concentrate and the required amount of compressed air.

Foaming concentrate is dosed by a special foam pump and a FA dispenser. Dosing is provided by the speed variation of foam pump, whose capacity varies quasiproportional to the speed of rotation. The required (target) speed value is calculated from the set proportion based on the current water flow rate. The water flow is measured continuously using a suitable device—a water flow meter.

Compressed air is metered by means of special pneumatic equipment, controlled automatically by the air flow meter and presets, depending on the current water flow rate. The compressor speed is not controlled, because it is determined only by the parameters of belt drive and the speed of fire pump, and the latter is set by the operator according to the criterion of obtaining the desired water pressure at the fire pump outlet.

Disadvantages of this engineering solution selected as the closest equivalent include:

the limitation of its application when operating from backwater sources (fire hydrants, etc.), which is due to the presence of a single drive compressor and fire pump, because if there is a pressure at the fire pump inlet, the fire pump rotation with reduced speed (up to its complete stop) should be set to get the desired pressure at the pump outlet, while such rotation is not enough for a compressor connected to a fire pump by a mechanical transmission to provide the desired output as per compressed air. Another disadvantages of using a single compressor and fire pump drive are the inability to provide separate installation of these elements in the compartments of the vehicle, and the inability to control compressor speed, in particular to provide a smooth start and stop;

dependence of its output characteristics (intensity and range of the foam jet) on the hydraulic resistance of pressure hoses that supply ready foam and on the geometric height of the foam rise along the hoses. Both of these values determine so-called backpressure at the unit outlet, and as it grows, the flow rate of water (and therefore of both other foam components—foam concentrate and compressed air) will decrease, up to the complete termination. To compensate for this reduction in intensity, the operator shall manually adjust the pressure at the fire pump outlet, which is not always possible due to the lack of direct visibility of the jet from the operator's workplace.

The problem solved by the proposed group of inventions is the improvement of stability, reliability and performance of the mobile firefighting unit.

Technical result achieved by the group of inventions is the possibility to obtain foam required in terms of head and density.

The technical result achieved by the first claimed engineering solution is the possibility to obtain foam required in terms of head and density in any mode of the water pump operation, including without turning on the water pump, in automatic mode with varying foam back pressure at the outlet of the mobile firefighting unit.

Said technical result is achieved due to the fact that the mobile compressed foam firefighting unit comprising a mixing chamber connected at the outlet to the foam feeder taking foam to the seat of fire, and the following systems connected by pipes to the mixing chamber inlet: a water supply system comprising a water pump and a water pump drive, a foam concentrate supply system comprising a foam pump and a foam pump drive, and an air supply system comprising an air compressor and an air pump drive, according to the claimed solution, also comprises a drive motor, is equipped with a water flow meter, a throttle valve with an electric drive and a check valve, and an electronic control unit of the throttle valve installed in the water supply pipe between the water pump and the mixing chamber; and the input of the throttle valve control unit is electrically connected with the water flow meter output, and the throttle valve control unit output is electrically connected with the input of the electric throttle valve drive, and drives of the air compressor and the foam pump are designed as variable hydraulic transmission of the air compressor drive and variable hydraulic transmission of the foam pump drive kinetically connected to the drive motor.

An internal combustion engine or electric motor is installed primarily as a drive motor, and drives of the air compressor and foam pump are mainly made independent of the fire pump drive.

And the variable hydraulic transmission of the air compressor drive may include an adjustable hydraulic pump and a non-adjustable hydraulic motor for the air compressor drive connected by piping. Also, the variable hydraulic transmission for the foam pump drive may include an adjustable hydraulic pump and a non-adjustable hydraulic motor for the foam pump drive connected by piping.

Moreover, the water supply system may contain a water valve, water flow meter, drain valve, motorized throttle valve, and check valve installed in series in the pipeline between the water pump and the mixing chamber, and may also be equipped with an electronic control unit of the throttle valve, where the electrical output of the water flow meter is electrically connected to the input of the throttle valve's electronic control unit and the output of the throttle valve's electronic control unit is connected by an electrical conductor with the input of the throttle valve's electric drive. In addition, the foam concentrate supply system may include a container for the foam concentrate and a foam pump, a foam concentrate drain valve, a foam concentrate flow meter, a foam concentrate check valve installed in series in the pipeline between the foam concentrate container and the mixing chamber foam concentrate supply valve, and can also be equipped with an electronic control unit of the foam concentrate supply system with its inputs connected by electrical conductors to the outputs of the foam pump rotation sensor and the foam concentrate flow meter, and with its output connected by electrical conductor to the input of the controlled hydraulic pump of the foam pump drive's hydraulic transmission. And the air supply system can be equipped with a three-way valve and an air check valve installed in series in the pipe between the air compressor and the mixing chamber, and with an electronic control unit of the air supply system with its output connected by an electric wire to the input of the adjustable hydraulic pump of the air compressor drive's hydraulic transmission, and with its input connected to the rotation sensor of the air compressor. In addition, the electrical input of the foam concentrate supply system's electronic control unit and the electrical input of the air supply system's electronic control unit can be electrically connected to the electrical output of the water flow meter or to the electrical output of the throttle valve's electronic control unit.

Also, the air supply system can be connected to the water supply system by a pipeline containing a drain check valve and a drain cock installed in series. The water supply system can be connected to the foam concentrate supply system by a pipeline containing a flushing valve.

The mobile firefighting unit can be installed on the chassis of a ground vehicle or on mobile railway platforms.

The technical result achieved by the second claimed engineering solution is the possibility to obtain the required head and density of foam at any operating mode of the water pump, including without the water pump activation, if the water head in the fire hydrant will be sufficient to deliver water without increasing the water pump head, or with activation of the water pump at reduced speed, in particular when taking water from fire hydrants with insufficient head, and to enable the compressor speed control, in particular, to provide a smooth start and stop of the compressor.

Said technical result is achieved due to the fact that the mobile firefighting unit with compression foam generation comprising the mixing chamber connected at the outlet with a device of foam supply to the seat of fire, and a water supply system connected with the mixing chamber inlet by pipelines that includes a water supply pump with a drive, a foam concentrate supply system that includes a foam pump with a foam pump drive, and an air supply system that includes an air compressor with a drive, according to the claimed solution is additionally equipped with a drive motor, and drives of the air compressor and the foam pump are designed as a variable hydraulic transmission of the air compressor drive and a variable hydraulic transmission of the foam pump drive kinetically connected to the drive motor.

An internal combustion engine or an electric motor is primarily installed as a drive motor. Drives of the air compressor and foam pump are mostly made independent of the fire pump drive.

And the variable hydraulic transmission of the air compressor drive may include an adjustable hydraulic pump and a non-adjustable hydraulic motor for the air compressor drive connected by piping. Also, the variable hydraulic transmission for the foam pump drive may include an adjustable hydraulic pump and a non-adjustable hydraulic motor for the foam pump drive connected by piping.

Moreover, the water supply system may contain a water valve, water flow meter, drain valve, motorized throttle valve and check valve installed in series in the pipeline between the water pump and the mixing chamber, and may also be equipped with an electronic control unit of the throttle valve, where the electrical output of the water flow meter is electrically connected to the input of the throttle valve's electronic control unit and the output of the throttle valve's electronic control unit is connected by an electrical conductor with the input of the throttle valve's electric drive. In addition, the foam concentrate supply system may include a container for the foam concentrate and a foam pump, a foam concentrate drain valve, a foam concentrate flow meter, a foam concentrate check valve installed in series in the pipeline between the foam concentrate container and the mixing chamber foam concentrate supply valve, and can also be equipped with an electronic control unit of the foam concentrate supply system with its inputs connected by electrical conductors to the outputs of the foam pump rotation sensor and the foam concentrate flow meter, and with its output connected by electrical conductor to the input of the controlled hydraulic pump of the foam pump drive's hydraulic transmission. And the air supply system can be equipped with a three-way valve and an air check valve installed in series in the pipe between the air compressor and the mixing chamber, and with an electronic control unit of the air supply system with its output connected by an electric wire to the input of the adjustable hydraulic pump of the air compressor drive's hydraulic transmission, and with its input connected to the rotation sensor of the air compressor. In addition, the electrical input of the foam concentrate supply system's electronic control unit and the electrical input of the air supply system's electronic control unit can be electrically connected to the electrical output of the water flow meter or to the electrical output of the throttle valve's electronic control unit.

Also, the air supply system can be connected to the water supply system by a pipeline containing a drain check valve and a drain cock installed in series. The water supply system can be connected to the foam concentrate supply system by a pipeline containing a flushing valve.

Also, a mobile firefighting unit can be installed on the chassis of a ground vehicle or on mobile railway platforms.

The technical result achieved by the third claimed engineering solution is the possibility to automatically obtain the required head and density of foam at varying back pressure of foam at the outlet of the mobile firefighting unit, as a result of changing hydraulic resistance of the pressure hoses and geometric height of the foam lift along these hoses, while achieving the highest efficiency of the unit by stable foam delivery mode, which is maintained automatically, regardless of possible variations in the characteristics of the pressure line at the outlet of the mobile fire firefighting unit.

Said technical result is achieved due to the fact that the mobile firefighting unit with compression foam generation comprising a mixing chamber connected at the outlet to the device of foam supply to the seat of fire, and water supply system that includes a water pump and a water pump drive, a foam concentrate supply system that includes a foam pump and a foam pump drive, and an air supply system that includes an air compressor and an air pump drive, all the systems connected by pipelines to the inlet of the mixing chamber, according to the claimed solution is equipped with a water flow meter, a throttle valve with an electric drive, and an electronic control unit of the throttle valve installed in the water supply pipeline between the water pump and the mixing chamber, whereby the input of the throttle valve control unit is electrically connected with the output of the water flow meter, and the output of the throttle valve control unit is electrically connected with the input of the throttle valve's electric drive.

And the foam concentrate supply system may include a foam concentrate container and a foam concentrate supply valve, a foam pump, a foam concentrate drain valve, a foam concentrate flow meter, and a foam concentrate check valve installed in series in the pipeline between the foam concentrate container and the mixing chamber, and can also be equipped with an electronic control unit of the foam concentrate supply system with its inputs connected by electrical conductors to the outputs of the foam pump rotation sensor and the foam concentrate flow meter, and with its output connected by electrical conductor to the input of the controlled hydraulic pump of the foam pump drive's hydraulic transmission. Also, the air supply system can be equipped with a three-way valve and an air check valve installed in series in the pipeline between the air compressor and the mixing chamber, and an electronic control unit of the air supply system with its output connected by an electric conductor to the input of the adjustable hydraulic pump of the air compressor drive's hydraulic transmission, and with its input connected to the rotation sensor of the air compressor. The electrical input of the foam concentrate supply system's electronic control unit and the electrical input of the air supply system's electronic control unit are primarily connected electrically to the electrical output of the water flow meter or to the electrical output of the throttle valve's electronic control unit.

The mobile firefighting unit can be installed on the chassis of a ground vehicle or on mobile railway platforms.

Figure 1:
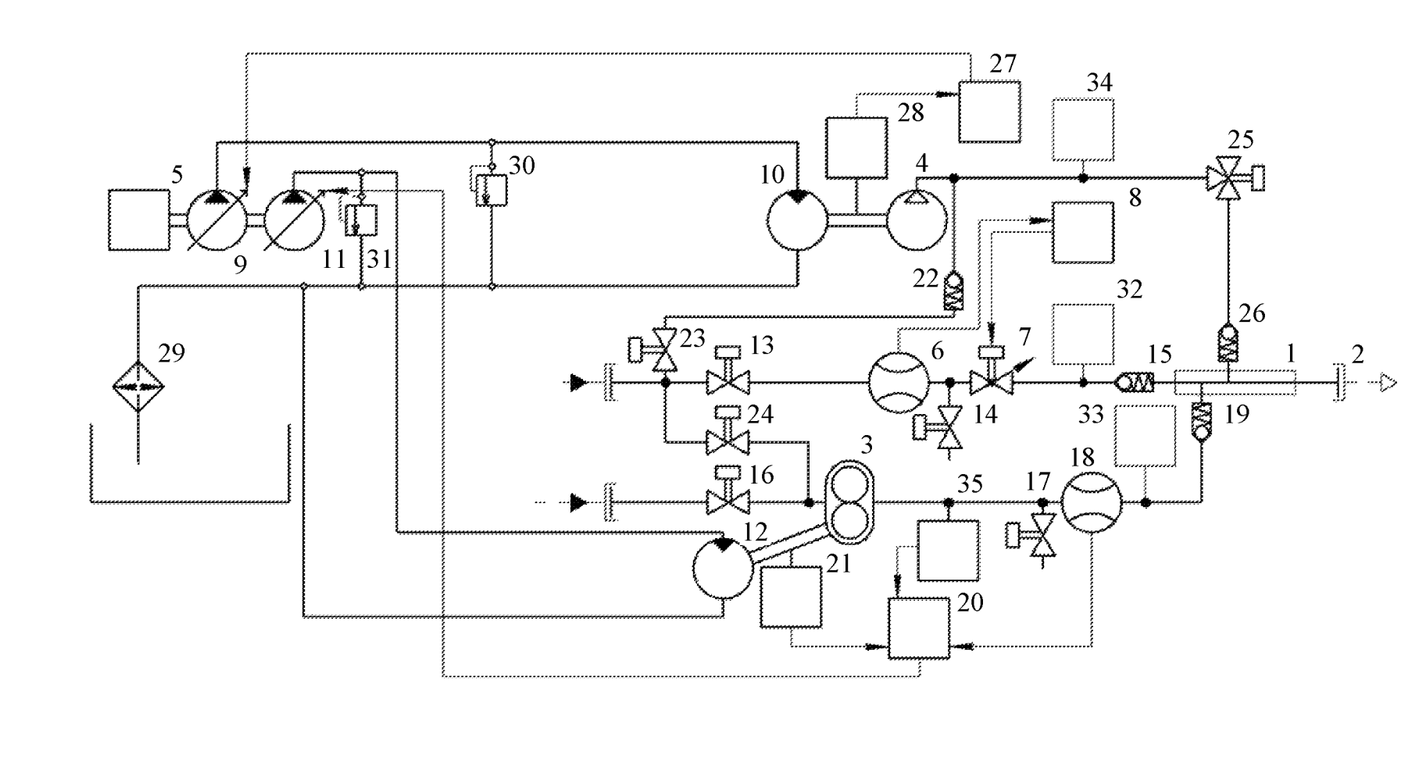
FIG. 1 illustrates an example of a functional diagram of the mobile compressed foam firefighting unit.

The group of claimed inventions is illustrated by drawings, where the FIGURE shows a functional diagram of the mobile compressed foam firefighting unit.

The first proposed engineering solution, a mobile compressed foam firefighting unit, is explained by a specific embodiment described below, however, the example given is not the only possible, but clearly demonstrates the possibility of achieving this combination of essential features of the claimed technical result.

DETAILED DESCRIPTION OF THE DRAWINGS

A mobile compressed foam firefighting unit comprises a mixing chamber 1 connected at the outlet with a device 2 of foam supply to the seat of fire, and a water supply system that includes a water pump (not shown in the diagram) with a drive, a foam concentrate supply system that includes a foam pump 3 with a foam pump drive, and an air supply system that includes an air compressor 4 with a drive, all of them connected to the inlet of the mixing chamber 1 by pipelines. The mobile firefighting unit is additionally equipped with a drive motor 5, and drives of the air compressor 4 and the foam pump 3 are designed as a variable hydraulic transmission of the air compressor drive 4 and a variable hydraulic transmission of the foam pump drive 3 kinetically connected to the drive motor 5. The mobile firefighting unit is equipped with a water flow meter 6, a throttle valve 7 with an electric drive (not shown in the FIGURE), and an electronic control unit 8 of the throttle valve 7 installed in the water supply pipeline between the water pump (not shown in the FIGURE) and the mixing chamber 1, wherein the input of the electronic control unit 8 of the throttle valve 7 is electrically connected to the output of the water flow meter 6, and the output of the electronic control unit 8 of the throttle valve 7 is electrically connected to the input of the throttle valve's 7 electric drive.

An internal combustion engine is installed as a drive motor 5. An electric motor can be used instead of a combustion engine.

The variable hydraulic transmission of the air compressor drive 4 includes an adjustable hydraulic pump 9 and a non-adjustable hydraulic motor 10 of the air compressor drive 4 connected to it by pipelines.

The variable hydraulic transmission of the foam pump drive 3 includes an adjustable hydraulic pump 11 and a non-adjustable hydraulic motor 12 for the foam pump drive 3 connected to it by pipelines.

The water supply system comprises a water valve 13, a water flow meter 6, a water drain valve 14, a throttle valve 7 with an electric drive (the electric drive is not shown in the FIGURE) and a check valve 15 installed in series in the pipeline between the water pump (not shown in the FIGURE) and the mixing chamber 1, and also has an electronic control unit 8 of the throttle valve 7, with the electrical output of the water flow meter 6 electrically connected to the input of the electronic control unit 8 of the throttle valve 7, and the output of the electronic control unit 8 of the throttle valve 7 connected by electric conductor to the input of the throttle valve's 7 electric drive.

The foam concentrate supply system includes a foam concentrate container (not shown in the FIGURE) and a foam concentrate supply valve 16, a foam pump 3, a foam concentrate drain valve 17, a foam concentrate flow meter 18, and a foam concentrate check valve 19 installed in series in the pipeline between the foam concentrate container and the mixing chamber 1, and has an electronic control unit 20 of the foam concentrate supply system, with its inputs connected by electrical conductors to the outputs of the foam pump 3 rotation sensor 21 and the foam concentrate flow meter 18 and with its output connected by electrical conductor to the input of the adjustable hydraulic pump 11 of the foam pump drive's 3 hydraulic transmission.

The air supply system is connected to the water supply system by a pipeline containing a check drain valve 22 and a drain valve 23 installed in series.

Besides, the water supply system is connected to the foam concentrate supply system by a pipeline comprising a flushing valve 24.

The air supply system has a three-way valve 25 and a check air valve 26 installed in series in the pipeline between the air compressor 4 and the mixing chamber 1; it also has an electronic control unit 27 of the air supply system, with its output electrically connected to the input of the controlled hydraulic pump 9 of the air compressor's 4 hydraulic transmission drive, and with its input electrically connected to the output of the air compressor's 4 rotation sensor 28.

In addition, the electrical input of the electronic control unit 20 of the foam concentrate supply system and the electrical input of the electronic control unit 27 of the air supply system are electrically connected to the electrical output of the water flow meter 6 (the connection is not shown in the FIGURE). To obtain data on the current water flow rate, these electrical inputs can be electrically connected to the electrical output of the electronic control unit 8 of the throttle valve 7, which receives this data from the water flow meter 6.

Drives of the air compressor 4 and foam pump 3 are made independent of the fire pump drive (not shown in the FIGURE).

The mobile firefighting unit is installed on the chassis of a ground vehicle (not shown in the FIGURE), while it can be installed on mobile railway platforms.

Also, a functional diagram of the mobile compressed foam firefighting unit shown in the FIGURE comprises the following auxiliary components included in the firefighting unit, including: a heat exchanger 29 providing oil cooling in the variable hydraulic transmission of the air compressor 4 drive and the variable hydraulic transmission of the foam pump 3 drive; safety valves 30 and 31 protecting the variable hydraulic transmission of the air compressor 4 drive and the variable hydraulic transmission of the foam pump 3 drive from exceeding the set oil pressure; a water pressure sensor 32, a foam concentrate pressure sensor 33 and an air pressure sensor 34 providing an operator with information about the current state of the system; a foam concentrate supply system filling sensor 35, with its electrical output connected to the input of the electronic control unit 20 of the foam concentrate supply system.

The mobile compressed foam firefighting unit relating to the first engineering solution operates as follows.

The required water pressure is supplied to the water supply system by a water pump (not shown in the FIGURE) from the tank (not shown in the FIGURE) or by a fire hydrant without an additional increase in water pressure by a water pump, or by a fire hydrant with an additional increase in water pressure by a water pump, which is selected depending on the unit location. In the water supply system, the water pressure is controlled by the electronic control unit 8 with a water flow meter 6, and varies as required by the throttle valve 7, after which the water flows through the check valve 15 into the mixing chamber 1. Thus, with increasing or decreasing foam back pressure at the outlet of the mobile firefighting unit, the water flow meter 6 records data on the increase or decrease in water consumption respectively, and sends them to the control unit 8, which according to the type of foam (lighter ("dry") or heavier ("wet") one) controls the level of throttle valve 7 opening, so that the required water pressure enters the mixing chamber 1 to generate compressed foam.

The drive motor 5 drives the hydraulic pump 9 and the hydraulic pump 11.

Depending on the water pressure, the data whereon come from the water flow meter 6 (or the electronic control unit 8) to the electronic control unit 20 of the foam concentrate supply system, the latter controls operation of the adjustable hydraulic pump 11 of the drive's hydraulic transmission, which drives the non-adjustable hydraulic motor 12, which in turn drives the foam pump 3. The electronic control unit 20 of the foam concentrate supply system uses the foam pump rotation sensor 21 to receive data on the foam pump 3 speed, the flow meter 18 to receive data on the flow rate of the foam concentrate, and the filling sensor 35 to receive data on the foam concentrate supply system filling. Depending on the required foam characteristics—a lighter ("dry") or heavier ("wet") foam at different water head, the foam pump 3 supplies the required amount of foam concentrate with the required head from the foam concentrate tank (not shown in the FIGURE) through the check valve 19 into the mixing chamber 1.

Depending on the water pressure, the data whereon come from the water flow meter 6 (or the electronic control unit 8) to the electronic control unit 27 of the air supply system, the latter controls operation of the adjustable hydraulic pump 9 of the drive's hydraulic transmission, which drives the non-adjustable hydraulic motor 10, which in turn drives the compressor 4. The electronic control unit 27 of the air supply system receives data on the compressor 4 speed using the compressor rotation sensor 28. Depending on the required foam characteristics—a lighter ("dry") or heavier ("wet") foam at different water pressure, the compressor 4 supplies compressed air through the check valve 26 into the mixing chamber 1 with the required amount of air at the required pressure.

A mobile compressed foam firefighting unit operator can monitor operation of the water supply system with a water pressure sensor 32, operation of the foam concentrate supply system with a foam concentrate pressure sensor 33, and operation of the air supply system with an air pressure sensor 34. Based on the data obtained, the operator can increase the water supply pressure, including by adjusting the throttle valve 7 opening; at the same time, with a given type of foam, the foam concentrate and air supply system can automatically change supply pressure of the foam concentrate and air supply pressure. The operator can also change supply pressure of the foam concentrate and air pressure, regardless of the supplied water pressure, according to the required parameters.

There is an intensive bubbling in the mixing chamber 1, where the required amount of water, foam concentrate and air are fed under pressure. During the bubbling the components are transformed into finished foam. Finished foam from the mixing chamber 1 enters device 2 that supplies the foam into the seat of fire.

After the mobile compressed foam firefighting unit is used in the compressed foam generation mode, said unit can be flushed by closing the water valve 13, opening the flushing valve 24, closing the foam concentrate supply valve 16, and feeding water with a water pump (not shown in the FIGURE) under pressure through the foam concentrate supply system until the foam concentrate residue is completely removed. Thereafter, the mobile compressed foam firefighting unit may be dried by closing the three-way valve 25, opening the drain valve 23, closing the water supply valve (not shown in the FIGURE), opening the water valve 13, opening the flushing valve 24, closing the foam concentrate supply valve 16, and supplying air by the compressor 4 through the drain check valve 22, the water supply system, and the foam concentrate supply system, including through the open foam concentrate drain valve 17 and the water drain valve 14, until they are drained.

The second proposed engineering solution, a mobile compressed air firefighting unit, is explained by a specific embodiment described below, however, the example given is not the only possible, but clearly demonstrates the possibility of achieving this combination of essential features of the claimed technical result.

A mobile compressed foam firefighting unit comprises a mixing chamber 1 connected at the outlet with a device 2 of foam supply to the seat of fire, and a water supply system that includes a water pump (not shown in the diagram) with a drive, a foam concentrate supply system that includes a foam pump 3 with a foam pump drive, and an air supply system that includes an air compressor 4 with a drive, all of them connected to the inlet of the mixing chamber 1 by pipelines. The mobile firefighting unit is additionally equipped with a drive motor 5, and drives of the air compressor 4 and the foam pump 3 are designed as a variable hydraulic transmission of the air compressor drive 4 and a variable hydraulic transmission of the foam pump drive 3 kinetically connected to the drive motor 5.

An internal combustion engine is installed as a drive motor 5. An electric motor can be used instead of a combustion engine.

The variable hydraulic transmission of the air compressor drive 4 includes an adjustable hydraulic pump 9 and a non-adjustable hydraulic motor 10 of the air compressor drive 4 connected to it by pipelines.

The variable hydraulic transmission of the foam pump drive 3 includes an adjustable hydraulic pump 11 and a non-adjustable hydraulic motor 12 for the foam pump drive 3 connected to it by pipelines.

The water supply system comprises a water valve 13, a water flow meter 6, a water drain valve 14, a throttle valve 7 with an electric drive (the electric drive is not shown in the FIGURE) and a check valve 15 installed in series in the pipeline between the water pump (not shown in the FIGURE) and the mixing chamber 1, and also has an electronic control unit 8 of the throttle valve 7, with the electrical output of the water flow meter 6 electrically connected to the input of the electronic control unit 8 of the throttle valve 7, and the output of the electronic control unit 8 of the throttle valve 7 connected by electric conductor to the input of the throttle valve's 7 electric drive.

The foam concentrate supply system includes a foam concentrate container (not shown in the FIGURE) and a foam concentrate supply valve 16, a foam pump 3, a foam concentrate drain valve 17, a foam concentrate flow meter 18, and a foam concentrate check valve 19 installed in series in the pipeline between the foam concentrate container and the mixing chamber 1, and has an electronic control unit 20 of the foam concentrate supply system, with its inputs connected by electrical conductors to the outputs of the foam pump 3 rotation sensor 21 and the foam concentrate flow meter 18 and with its output connected by electrical conductor to the input of the adjustable hydraulic pump 11 of the foam pump drive's 3 hydraulic transmission.

The air supply system is connected to the water supply system by a pipeline containing a check drain valve 22 and a drain valve 23 installed in series.

Besides, the water supply system is connected to the foam concentrate supply system by a pipeline comprising a flushing valve 24.

The air supply system has a three-way valve 25 and a check air valve 26 installed in series in the pipeline between the air compressor 4 and the mixing chamber 1; it also has an electronic control unit 27 of the air supply system, with its output electrically connected to the input of the controlled hydraulic pump 9 of the air compressor's 4 hydraulic transmission drive, and with its input electrically connected to the output of the air compressor's 4 rotation sensor 28.

In addition, the electrical input of the electronic control unit 20 of the foam concentrate supply system and the electrical input of the electronic control unit 27 of the air supply system are electrically connected to the electrical output of the water flow meter 6 (the connection is not shown in the FIGURE). To obtain data on the current flow rate, these electrical inputs can be electrically connected to the electrical output of the electronic control unit 8 of the throttle valve 7, which receives this data from the water flow meter 6.

Drives of the air compressor 4 and foam pump 3 are made independent of the fire pump drive (not shown in the FIGURE).

The mobile firefighting unit is installed on the chassis of a ground vehicle (not shown in the FIGURE), while it can be installed on mobile railway platforms.

Also, a functional diagram of the mobile compressed foam firefighting unit shown in the FIGURE comprises the following auxiliary components included in the firefighting unit, including: a heat exchanger 29 providing oil cooling in the variable hydraulic transmission of the air compressor 4 drive and the variable hydraulic transmission of the foam pump 3 drive; safety valves 30 and 31 protecting the variable hydraulic transmission of the air compressor 4 drive and the variable hydraulic transmission of the foam pump 3 drive from exceeding the set oil pressure; a water pressure sensor 32, a foam concentrate pressure sensor 33 and an air pressure sensor 34 providing an operator with information about the current state of the system;

a foam concentrate supply system filling sensor 35, with its electrical output connected to the input of the electronic control unit 20 of the foam concentrate supply system.

The mobile compressed foam firefighting unit referring to the second engineering solution operates as follows.

The required water pressure is supplied to the water supply system by a water pump (not shown in the FIGURE) from the tank (not shown in the FIGURE) or by a fire hydrant without an additional increase in water pressure by a water pump, or by a fire hydrant with an additional increase in water pressure by a water pump, which is selected depending on the unit location. In the water supply system, the water pressure is controlled by the electronic control unit 8 with a water flow meter 6, and varies as required by the throttle valve 7, after which the water flows through the check valve 15 into the mixing chamber 1.

The drive motor 5 drives the hydraulic pump 9 and the hydraulic pump 11.

Depending on the water pressure, the data whereon come from the water flow meter 6 (or the electronic control unit 8) to the electronic control unit 20 of the foam concentrate supply system, the latter controls operation of the adjustable hydraulic pump 11 of the drive's hydraulic transmission, which drives the non-adjustable hydraulic motor 12, which in turn drives the foam pump 3. The electronic control unit 20 of the foam concentrate supply system uses the foam pump rotation sensor 21 to receive data on the foam pump 3 speed, the flow meter 18 to receive data on the flow rate of the foam concentrate, and the filling sensor 35 to receive data on the foam concentrate supply system filling. Depending on the required foam characteristics—a lighter ("dry") or heavier ("wet") foam at different water head, the foam pump 3 supplies the required amount of foam concentrate with the required head from the foam concentrate tank (not shown in the FIGURE) through the check valve 19 into the mixing chamber 1.

Depending on the water pressure, the data whereon come from the water flow meter 6 (or the electronic control unit 8)

to the electronic control unit 27 of the air supply system, the latter controls operation of the adjustable hydraulic pump 9 of the drive's hydraulic transmission, which drives the non-adjustable hydraulic motor 10, which in turn drives the compressor 4. The electronic control unit 27 of the air supply system receives data on the compressor 4 speed using the compressor rotation sensor 28. Depending on the required foam characteristics—a lighter ("dry") or heavier ("wet") foam at different water pressure, the compressor 4 supplies compressed air through the check valve 26 into the mixing chamber 1 with the required amount of air at the required pressure.

A mobile compressed foam firefighting unit operator can monitor operation of the water supply system with a water pressure sensor 32, operation of the foam concentrate supply system with a foam concentrate pressure sensor 33, and operation of the air supply system with an air pressure sensor 34. Based on the data obtained, the operator can increase the water supply pressure, including by adjusting the throttle valve 7 opening; at the same time, with a given type of foam, the foam concentrate and air supply system can automatically change supply pressure of the foam concentrate and air supply pressure. The operator can also change supply pressure of the foam concentrate and air pressure, regardless of the supplied water pressure, according to the required parameters.

There is an intensive bubbling in the mixing chamber 1, where the required amount of water, foam concentrate and air are fed under pressure. During the bubbling the components are transformed into finished foam. Finished foam from the mixing chamber 1 enters device 2 that supplies the foam into the seat of fire.

After the mobile compressed foam firefighting unit is used in the compressed foam generation mode, said unit can be flushed by closing the water valve 13, opening the flushing valve 24, closing the foam concentrate supply valve 16, and feeding water with a water pump (not shown in the FIGURE) under pressure through the foam concentrate supply system until the foam concentrate residue is completely removed. Thereafter, the mobile compressed foam firefighting unit may be dried by closing the three-way valve 25, opening the drain valve 23, closing the water supply valve (not shown in the FIGURE), opening the water valve 13, opening the flushing valve 24, closing the foam concentrate supply valve 16, and supplying air by the compressor 4 through the drain check valve 22, the water supply system, and the foam concentrate supply system, including through the open foam concentrate drain valve 17 and the water drain valve 14, until they are drained.

The third proposed engineering solution, a mobile compressed foam firefighting, is explained by a specific design, described below, however, the example given is not the only possible, but clearly demonstrates the possibility of achieving this combination of essential features of the claimed technical result.

The mobile compressed foam firefighting unit comprises a mixing chamber 1, whose output is connected to a device 2 for supplying foam to the seat of fire, and the water supply system that includes a water pump (not shown in the FIGURE) and a water pump drive (not shown in the FIGURE), a foam concentrate supply system that includes a foam pump 3 and a foam pump drive 3, and an air supply system that includes an air compressor 4 and an air compressor 4 drive, all the systems connected by pipelines to the mixing chamber 1 inlet. The mobile firefighting unit is equipped with a water flow meter 6, a throttle valve 7 with an electric drive (not shown in the FIGURE), and an electronic control unit 8 of the throttle valve 7 installed in the water supply pipeline between the water pump (not shown in the FIGURE) and the mixing chamber 1, wherein the input of the electronic control unit 8 of the throttle valve 7 is electrically connected to the output of the water flow meter 6, and the output of the electronic control unit 8 of the throttle valve 7 is electrically connected to the input of the throttle valve's 7 electric drive.

The foam concentrate supply system comprises a foam concentrate container (not shown in the FIGURE) and a foam concentrate supply valve 16, a foam pump 3, a foam concentrate drain valve 17, a foam concentrate flow meter 18, and a foam concentrate check valve 19 installed in series in the pipeline between the foam concentrate container and the mixing chamber 1. The foam concentrate supply system is also provided with an electronic control unit 20 of the foam concentrate supply system, with its inputs connected by electrical conductors to the outputs of rotation sensor 3 of the foam pump 3 and the foam concentrate flow meter 18, and its output connected by electrical conductor to the input of the adjustable hydraulic pump 11 of the foam pump's 3 hydraulic transmission.

The air supply system has a three-way valve 25 and a check air valve 26 installed in series in the pipeline between the air compressor 4 and the mixing chamber 1; it also has an electronic control unit 27 of the air supply system, with its output electrically connected to the input of the controlled hydraulic pump 9 of the air compressor's 4 hydraulic transmission drive, and with its input electrically connected to the output of the air compressor's 4 rotation sensor 28. The electrical input of the electronic control unit 20 of the foam concentrate supply system and the electrical input of the electronic control unit 27 of the air supply system are electrically connected to the electrical output of the water flow meter 6 (the connection is not shown in the FIGURE). To obtain data on the current flow rate, said electrical inputs can be electrically connected to the electrical output of the electronic control unit 8 of the throttle valve 7, which receives this data from the water flow meter 6.

The mobile firefighting unit is installed on the chassis of a ground vehicle (not shown in the FIGURE). It can also be installed on mobile railway platforms.

Functional diagram of the mobile compressed foam firefighting unit shown in the FIGURE comprises the following auxiliary components that make up the firefighting unit.

The water supply system includes a water valve 13 to shut off the water supply, a drain valve 14, and a check valve 15 to prevent compressed foam from entering the water supply system.

The drive motor 5 is kinetically connected to the variable hydraulic transmission of the air compressor drive 4 and the variable hydraulic transmission of the foam pump drive 3. An internal combustion engine is installed as the drive motor 5, and an electric motor can be used instead of the internal combustion engine. The variable hydraulic transmission of the air compressor drive 4 includes an adjustable hydraulic pump 9 and a non-adjustable hydraulic motor 10 of the air compressor drive 4 connected to it by pipelines. The variable hydraulic transmission of the foam pump drive 3 includes an adjustable hydraulic pump 11 and a non-adjustable hydraulic motor 12 for the foam pump drive 3 connected to it by pipelines.

The air supply system is connected to the water supply system by a pipeline containing a check drain valve 22 and a drain valve 23 installed in series.

In addition, the water supply system is connected to the foam concentrate supply system by a pipeline comprising a flushing valve 24.

The mobile compressed foam firefighting unit also comprises a heat exchanger 29 providing oil cooling in the variable hydraulic transmission of the air compressor 4 drive and the variable hydraulic transmission of the foam pump 3 drive; safety valves 30 and 31 protecting the variable hydraulic transmission of the air compressor 4 drive and the variable hydraulic transmission of the foam pump 3 drive from exceeding the set oil pressure; a water pressure sensor 32, a foam concentrate pressure sensor 33 and an air pressure sensor 34 providing an operator with information about the current state of the system; a foam concentrate supply system filling sensor 35, with its electrical output connected to the input of the electronic control unit 20 of the foam concentrate supply system.

The mobile compressed foam firefighting unit referring to the third engineering solution operates as follows.

The required water pressure is supplied to the water supply system by the water pump (not shown in the FIGURE) from the tank (not shown in the FIGURE), or by a fire hydrant without an additional increase in water pressure by the water pump, or by a fire hydrant with an additional increase in water pressure by the water pump, which is selected depending on the unit location. In the water supply system, the water head is controlled by the electronic control unit 8 with a water flow meter 6 and varies as required by the throttle valve 7, after which the water flows through the check valve 15 into the mixing chamber 1. Thus, with increasing or decreasing foam back pressure at the outlet of the mobile firefighting unit, the water flow meter 6 records data on the increase or decrease in water consumption respectively, and sends them to the control unit 8, which according to the type of foam (lighter ("dry") or heavier ("wet") one) controls the level of throttle valve 7 opening, so that the required water pressure enters the mixing chamber 1 to generate compressed foam.

The drive motor 5 drives the hydraulic pump 9 and the hydraulic pump 11.

Depending on the water head, data whereon come from the water flow meter 6 (or the electronic control unit 8) to the electronic control unit 20 of the foam concentrate supply system, the latter controls operation of the adjustable hydraulic pump 11 of the drive's hydraulic transmission, which drives the non-adjustable hydraulic motor 12, which in turn drives the foam pump 3. The electronic control unit 20 of the foam concentrate supply system uses the foam pump rotation sensor 21 to receive data on the foam pump 3 speed, the flow meter 18 to receive data on the flow rate of the foam concentrate, and the filling sensor 35 to receive data on the foam concentrate supply system filling. Depending on the required foam characteristics—a lighter ("dry") or heavier ("wet") foam at different water head, the foam pump 3 supplies the required amount of foam concentrate with the required head from the foam concentrate tank (not shown in the FIGURE) through the check valve 19 into the mixing chamber 1.

Depending on the water head, data whereon come from the water flow meter 6 (or the electronic control unit 8) to the electronic control unit 27 of the air supply system, the latter controls the operation of the adjustable hydraulic pump 9 of the drive's hydraulic transmission, which drives the non-adjustable hydraulic motor 10, which drives the compressor 4. The electronic control unit 27 of the air supply system receives data on the compressor 4 speed using the compressor rotation sensor 28. Depending on the required foam characteristics—a lighter ("dry") or heavier ("wet") foam at different water pressure, the compressor 4 supplies compressed air through the check valve 26 into the mixing chamber 1 with the required amount of air at the required pressure.

A mobile compressed foam firefighting unit operator can monitor operation of the water supply system with a water pressure sensor 32, operation of the foam concentrate supply system with a foam concentrate pressure sensor 33, and operation of the air supply system with an air pressure sensor 34. Based on the data obtained, the operator can increase the water supply pressure, including by adjusting the opening of the throttle valve 7. At the same time, with a given type of foam, the foam concentrate and air supply system can automatically change supply pressure of the foam concentrate and air supply pressure. According to the required parameters, the operator can also change supply pressure of the foam concentrate and pressure of the air supplied independently of the supplied water pressure.

There is an intensive bubbling in the mixing chamber 1, where the required amount of water, foam concentrate and air are fed under pressure. During the bubbling the components are transformed into finished foam. Finished foam from the mixing chamber 1 enters device 2 that supplies the foam into the seat of fire.

After the mobile compressed foam firefighting unit is used in the compressed foam generation mode, said unit can be flushed by closing the water valve 20, opening the flushing valve 24, closing the foam concentrate supply valve 16, and feeding water with a water pump (not shown in the FIGURE) under pressure through the foam concentrate supply system until the foam concentrate residue is completely removed. Thereafter, the mobile compressed foam firefighting unit may be dried by closing the three-way valve 25, opening the drain valve 23, closing the water supply valve (not shown in the FIGURE), opening the water valve 13, opening the flushing valve 24, closing the foam concentrate supply valve 16, and supplying air by the compressor 4 through the drain check valve 22, the water supply system, and the foam concentrate supply system, including through the open foam concentrate drain valve 17 and the water drain valve 14.

The invention claimed is:
1. A mobile compressed foam firefighting unit comprising:
 a mixing chamber, an outlet of the mixing chamber connected to a foam feeder for providing foam to the seat of a fire;
 a water supply system comprising a water pump and a water pump drive connected by pipes to an inlet of the mixing chamber,
 a foam concentrate supply system comprising a foam pump and a foam pump drive connected by pipes to an inlet of the mixing chamber, and
 an air supply system comprising an air compressor and an air compressor drive connected by pipes to an inlet of the mixing chamber;
 wherein the firefighting unit comprises:
 a drive motor;
 a water flow meter, a throttle valve with an electric drive, a check valve, and an electronic control unit of the throttle valve installed in a water supply pipe between the water pump and the mixing chamber;
 input of the electronic control unit of the throttle valve is electrically connected with output of the water flow meter, and the output of the electronic control unit of the throttle valve is electrically connected with the input of the electric drive of the throttle valve;

the air compressor drive comprises a variable hydraulic transmission, and the foam pump drive comprises a variable hydraulic transmission; and the variable hydraulic transmission of the air compressor drive and the variable hydraulic transmission of the foam pump drive are kinetically connected to the drive motor.

2. The mobile compressed foam firefighting unit according to claim 1, wherein an internal combustion engine or electric motor is installed as a drive motor, and the air compressor drive and foam pump drive are independent of a fire pump drive.

3. The mobile compressed foam firefighting unit according to claim 1, wherein the variable hydraulic transmission of the air compressor drive comprises an adjustable hydraulic pump and a non-adjustable hydraulic motor for the air compressor drive connected by piping, and the variable hydraulic transmission for the foam pump drive comprises an adjustable hydraulic pump and a non-adjustable hydraulic motor for the foam pump drive connected by piping.

4. The mobile compressed foam firefighting unit according to claim 1, wherein the water supply system comprises a water valve, the water flow meter, a water drain valve, the throttle valve with the electric drive and the check valve installed in series in the water supply pipe between the water pump and the mixing chamber, and the water supply system comprises the electronic control unit of the throttle valve, with the output of the water flow meter electrically connected to the input of the electronic control unit of the throttle valve, and the output of the electronic control unit of the throttle valve connected by an electric conductor to the input of the electric drive of the;

wherein the foam concentrate supply system comprises a foam concentrate container and a foam concentrate supply valve, the foam pump, a foam concentrate drain valve, a foam concentrate flow meter, and a foam concentrate check valve installed in series in a pipeline between the foam concentrate container and the mixing chamber, and the foam concentrate supply system comprises an electronic control unit of the foam concentrate supply system, wherein inputs of the electronic control unit of the foam concentrate supply system are connected by electrical conductors to outputs of a rotation sensor of the foam pump and the foam concentrate flow meter and an output of the electronic control unit of the foam concentrate supply system is connected by an electrical conductor to an input of an adjustable hydraulic pump of the hydraulic transmission of the foam pump drive;

wherein the air supply system comprises a three-way valve and a check air valve installed in series in a pipeline between the air compressor and the mixing chamber, and the air supply system comprises an electronic control unit of the air supply system, wherein an output of the electronic control unit of the air supply system is electrically connected to an input of a controlled hydraulic pump of the variable hydraulic transmission of the air compressor drive, and an input of the electronic control unit of the air supply system is electrically connected to the output of a rotation sensor of the air compressor; and an electrical input of the electronic control unit of the foam concentrate supply system and an electrical input of the electronic control unit of the air-supply system are electrically connected to an electrical output of the water flow meter or to an electrical output of the electronic control unit of the throttle valve.

5. The mobile compressed foam firefighting unit according to claim 1, wherein the air supply system is connected to the water supply system by a pipeline comprising a check drain valve and a drain valve installed in series, and the water supply system is connected to the foam concentrate supply system by a pipeline comprising a flushing valve.

6. A chassis of a ground vehicle comprising the mobile compressed foam firefighting unit according to claim 1.

7. A mobile railway platform comprising the mobile compressed foam firefighting unit according to claim 1.

* * * * *